United States Patent
Dettinger et al.

(10) Patent No.: US 7,584,178 B2
(45) Date of Patent: Sep. 1, 2009

(54) QUERY CONDITION BUILDING USING PREDEFINED QUERY OBJECTS

(75) Inventors: Richard D. Dettinger, Rochester, MN (US); Daniel P. Kolz, Rochester, MN (US); Fred A. Kulack, Rochester, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/408,188

(22) Filed: Apr. 20, 2006

(65) Prior Publication Data

US 2007/0250472 A1    Oct. 25, 2007

(51) Int. Cl.
G06F 7/00    (2006.01)
G06F 17/00   (2006.01)
G06F 17/30   (2006.01)
G06F 12/00   (2006.01)

(52) U.S. Cl. .................... 707/3; 707/100; 707/200
(58) Field of Classification Search .................... 707/4, 707/3, 100, 200
See application file for complete search history.

(56) References Cited

U.S. PATENT DOCUMENTS

| | | | | |
|---|---|---|---|---|
| 5,724,570 | A | * | 3/1998 | Zeller et al. ................ 707/3 |
| 5,905,982 | A | * | 5/1999 | Carey et al. ................ 707/4 |
| 5,963,932 | A | * | 10/1999 | Jakobsson et al. .......... 707/2 |
| 6,571,233 | B2 | * | 5/2003 | Beavin et al. ............... 707/2 |
| 6,671,681 | B1 | * | 12/2003 | Emens et al. ................ 707/5 |
| 6,836,770 | B2 | * | 12/2004 | Gonnet ........................ 707/3 |
| 6,996,558 | B2 | | 2/2006 | Dettinger et al. |
| 2004/0083204 | A1 | * | 4/2004 | Dettinger et al. ............ 707/3 |
| 2004/0193567 | A1 | * | 9/2004 | Dettinger et al. ............ 707/1 |
| 2006/0248078 | A1 | * | 11/2006 | Gross et al. ................. 707/5 |

* cited by examiner

*Primary Examiner*—Mohammad Ali
*Assistant Examiner*—Brannon W Smith
(74) *Attorney, Agent, or Firm*—Patterson & Sheridan, LLP

(57) ABSTRACT

A method, system and article of manufacture for query processing and, more particularly, for managing execution of a query against data in a database. One embodiment comprises receiving a query having (i) at least one result field configured to return data from at least one data record included with the database, and (ii) a query condition comprising a field and a query object associated with the field by an operator configured to select values for the field from the query object. The method further comprises determining whether the query object is configured to provide one or more valid values for the field. If the query object is not configured to provide one or more valid values for the field, the query object is transformed into a transformed query object that is configured to provide one or more valid values for the field. Then, the query is executed against the database.

9 Claims, 9 Drawing Sheets

QUERY CONDITION BUILDING USING PREDEFINED QUERY OBJECTS

CROSS-RELATED APPLICATION

This application is related to the following commonly owned application: US Patent: U.S. Pat. No. 6,996,558, issued Feb. 7, 2006, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to query processing and, more particularly, to creating query conditions for queries against data in a database using predefined query objects.

2. Description of the Related Art

Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a database management system (DBMS) can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Any requesting entity, including applications, operating systems and, at the highest level, users, can issue queries against data in a database to obtain required information. Queries may be predefined (i.e., hard coded as part of an application) or generated in response to input (e.g., user input). Queries may include both an explicit specification of result fields for which data is to be returned upon execution of the queries, and criteria used for selection of the data. The data selection criteria are generally represented as query conditions that serve to filter the data returned for the result fields upon execution of the query. Accordingly, a query may be thought of as group of filters put together to sift out only the result field data of interest.

One common technique in query condition building consists in defining subqueries that are configured to define suitable data selection criteria. More specifically, for a given outer query an inner query, or subquery, can be defined such that a corresponding result set of the subquery is suitable to filter the data returned for the result fields of the outer query. In SQL, this can be performed using a so-called IN condition that links a field of a query condition of the given outer query to the subquery. Thus, by executing the subquery valid values for the field of the query condition can be identified. Such a subquery is particularly useful in cases where the valid values need to be retrieved from a different database table than the data that is to be returned for the result field(s) of the given outer query.

However, several difficulties occur in creating and using subqueries as query conditions for SQL queries against underlying databases. First, the users generally need some knowledge of the layout of an underlying database and of SQL to be able to accurately create a subquery for a given outer SQL query. This can be difficult and is error-prone if the outer SQL query and/or the subquery are complex. Furthermore, while a data type check may be performed on each query condition of the outer SQL query, it is not determined whether the values included with a retrieved query result for the subquery are suitable for an associated field of the outer SQL query. For instance, assume that a "patient_id" field of a query condition of a given outer query requires integer values and that an associated subquery returns integer values for a "weight" field. In this case, the data types of the "patient_id" field and the "weight" field are compatible and the outer SQL query is validated. However, a result set obtained in executing the outer SQL query may not be useful as the weight values may not be suitable for the "patient_id" field. Thus, merely confirming that the data type of the returned result set (i.e., weight values, which are integer values) corresponds to the data type of the outer query does not ensure that the returned values are, in fact, the values needed (since weight values are not patient IDs). Thus, mere data type checking is inadequate. Moreover, the subquery must return values only for a result field that matches the field of the query condition to which the subquery is linked. For instance, assume that the subquery returns values for the "patient_id" field and for another result field such as a "LastName" result field or the "weight" field as described above. In this case, the subquery would return too many output values and therefore the outer SQL query would result in an error when being executed.

Therefore, there is a need for an efficient technique for processing queries that include subqueries.

SUMMARY OF THE INVENTION

The present invention is generally directed to a method, system and article of manufacture for query processing and, more particularly, for managing execution of a query having a query condition that is defined using a predefined query object against data in a database.

One embodiment provides a computer-implemented method of managing execution of a query against data in a database. The method comprises receiving a first query having (i) at least one result field configured to return data from at least one data record included with the database, and (ii) a query condition comprising a field and a query object associated with the field by an operator configured to select values for the field from the query object. The method further comprises determining whether the query object is configured to provide one or more valid values for the field. If the query object is not configured to provide one or more valid values for the field, the query object is transformed into a transformed query object that is configured to provide one or more valid values for the field. Then, the first query is executed against the database, the first query including the transformed query object if the transforming was performed.

Another embodiment provides a computer-readable medium containing a program which, when executed by a processor, performs operations for managing execution of a query against data in a database. The operations comprise receiving a first query having (i) at least one result field configured to return data from at least one data record included with the database, and (ii) a query condition comprising a field and a query object associated with the field by an operator configured to select values for the field from the query object. The operations further comprise determining whether the query object is configured to provide one or more valid values for the field. If the query object is not configured to provide one or more valid values for the field, the query object is transformed into a transformed query object that is configured to provide one or more valid values for the field. Then, the first query is executed against the database, the first query including the transformed query object if the transforming was performed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
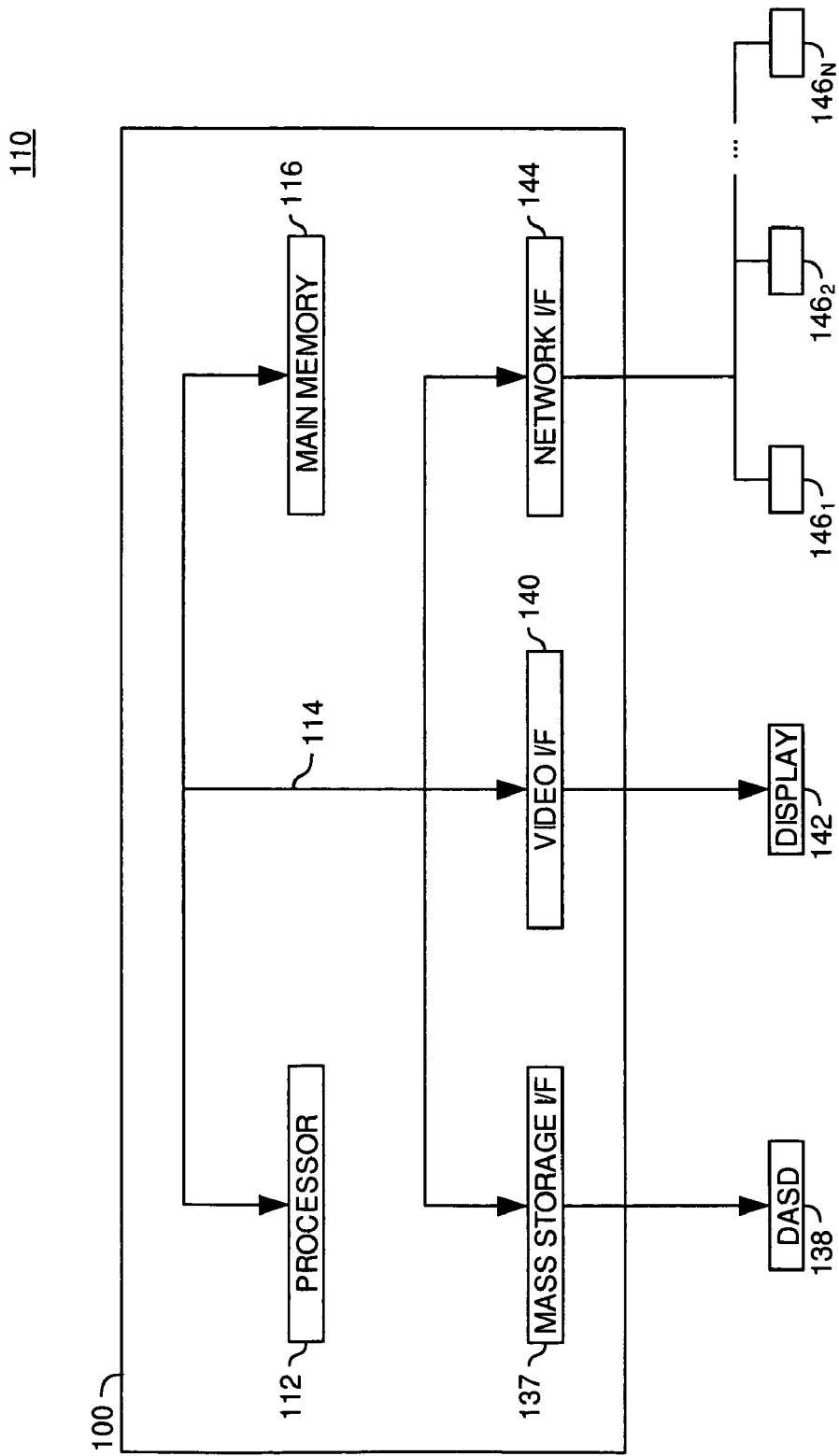
FIG. 1 is a computer system illustratively utilized in accordance with the invention.

The present invention is generally directed to a method, system and article of manufacture for query processing and, more particularly, for managing execution of a query against data in a database. In general, queries are executed against one or more underlying databases, each having a multiplicity of data records. Each query includes at least one result field for which data from the underlying database(s) is to be returned in a corresponding result set. A query may further include one or more query conditions for filtering which of the data records contained in the underlying database(s) are returned for each result field.

In one embodiment, a given query includes at least one query condition having a field and a query object. The query object is associated with the field by an operator configured to select values for the field from the query object. By way of example, the at least one query condition is a so-called IN condition that is defined using SQL.

According to one aspect, different types of query objects such as subqueries or predefined data sets can be associated with the field of the query condition. A subquery can be created by a user using a suitable query building user interface. Alternatively, the subquery can be retrieved from a repository of persistently stored queries. A predefined data set can be retrieved from a repository of persistently stored data sets that may include one or more query results.

In one embodiment, it is determined which type of query object is included with the given query. Then, it is determined whether the query object is configured to provide one or more valid values for the field of the at least one query condition. For instance, if the field of the at least one query condition is a "patient_id" field that requires integer values and if the query object is a subquery, it is determined whether the subquery returns integer values that are suitable for the "patient_id" field. If the query object is not configured to provide one or more valid values for the field, the query object is transformed on the basis of the determined type of the query object into a transformed query object that is configured to provide one or more valid values for the field. For instance, if the subquery in the given example returns character values for a "LastName" field, the subquery is modified to return suitable integer values for the "patient_id" field. Then, the query is executed against the underlying database(s).

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

Logical/Runtime View of Environment

Figure 2:
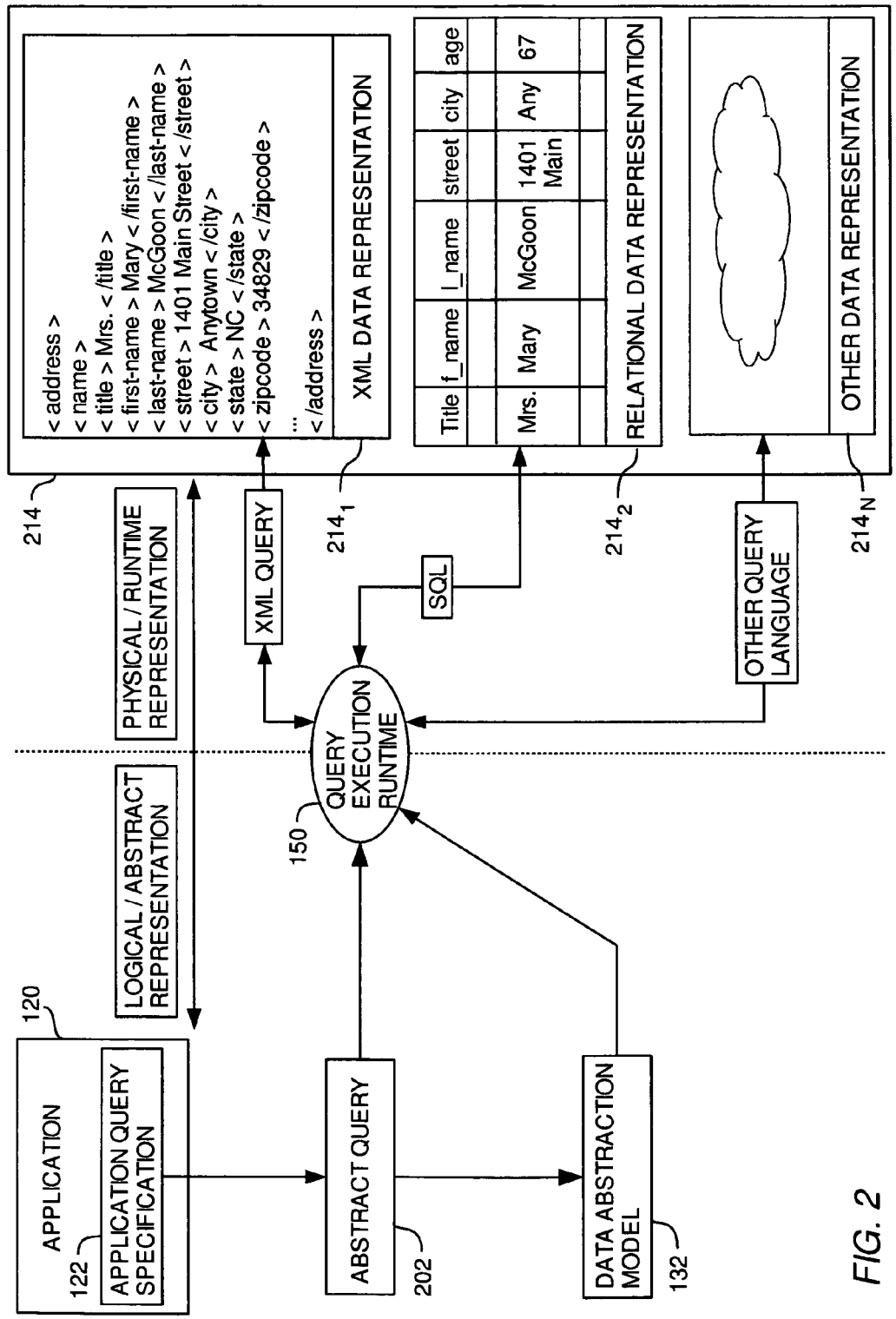
FIGS. 2-3 are relational views of software components in one embodiment.
Figure 3:
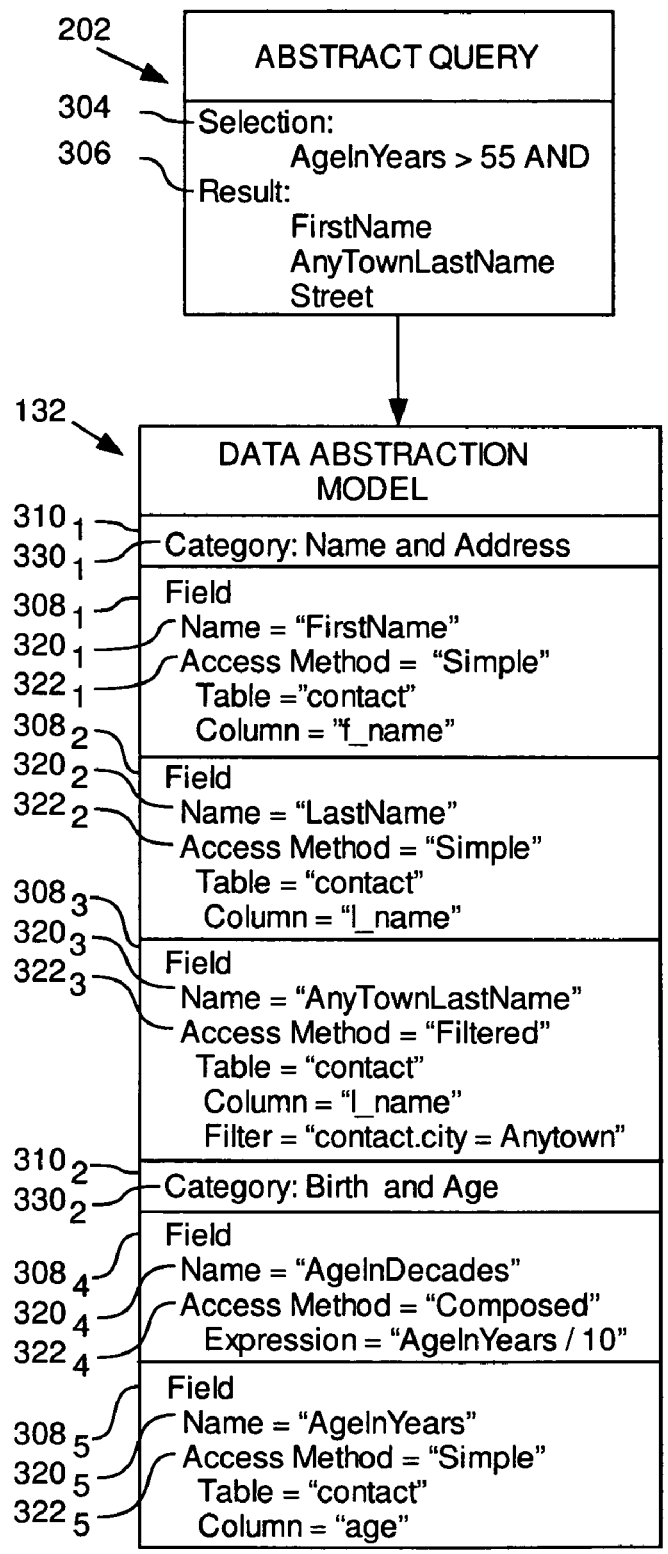

FIGS. 2-3 show an illustrative relational view of software components in one embodiment. According to one aspect, the software components are configured for query execution management and illustratively include one or more applications 120, a data abstraction model 132 and a database 214. By way of example, the database 214 includes a plurality of exemplary physical data representations $214_1, 214_2, \ldots 214_N$.

The application(s) 120 is configured to issue queries against the database 214. However, it should be noted that any suitable requesting entity including an operating system and, at the highest level, users may issue queries against the database 214. Accordingly, all such different implementations are broadly contemplated.

The queries issued by the application(s) 120 may be predefined (i.e., hard coded as part of the application(s) 120) or may be generated in response to input (e.g., user input). In one embodiment, the application(s) 120 issues a query 202 as defined by a corresponding application query specification 122. The resulting query 202 is generally referred to herein as an "abstract query" because the query is composed according to abstract (i.e., logical) fields rather than by direct reference to underlying physical data entities in the database 214. The logical fields are defined by the data abstraction model 132 which generally exposes information as a set of logical fields that may be used within a query (e.g., the abstract query 202) issued by the application(s) 120 to specify criteria for data selection and specify the form of result data returned from a query operation. In one embodiment, the application query specification 122 may include both criteria used for data selection (selection criteria 304) and an explicit specification of the fields to be returned (return data specification 306) based on the selection criteria 304, as illustrated in FIG. 3.

The logical fields of the data abstraction model 132 are defined independently of the underlying data representation (i.e., one of the plurality of exemplary physical data representations $214_{1-N}$) being used in the database 214, thereby allowing queries to be formed that are loosely coupled to the underlying data representation. More specifically, a logical field defines an abstract view of data whether as an individual data item or a data structure in the form of, for example, a database table. As a result, abstract queries such as the query 202 may be defined that are independent of the particular underlying data representation used. Such abstract queries can be transformed into a form consistent with the underlying physical data representation $214_{1-N}$ for execution against the database 214. By way of example, the abstract query 202 is translated by a runtime component 150 into a concrete (i.e., executable) query which is executed against the database 214 to determine a corresponding result set for the abstract query 202.

In one embodiment, illustrated in FIG. 3, the data abstraction model 132 comprises a plurality of field specifications $308_1, 308_2, 308_3, 308_4$ and $308_5$ (five shown by way of example), collectively referred to as the field specifications 308 (also referred to hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 132 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 214 of FIG. 2). As illustrated in FIG. 2, the access methods associate the logical field names to a particular physical data representation $214_{1-N}$ in the database. By way of illustration, two data representations are shown, an XML data representation $214_1$ and a relational data representation $214_2$. However, the physical data representation $214_N$ indicates that any other data representation, known or unknown, is contemplated. In one embodiment, a single data abstraction model 132 contains field specifications (with associated access methods) for two or more physical data representations $214_{1-N}$. In an alternative embodiment, a different single data abstraction model 132 is provided for each separate physical data representation $214_{1-N}$.

Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3 are representative of logical fields mapped to data represented in the relational data representation $214_2$ shown in FIG. 2. However, other instances of the data abstraction model 132 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

| |
|---|
| 001 <?xml version="1.0"?> |
| 002 <!--Query string representation: (AgeInYears > "55"--> |
| 003 <QueryAbstraction> |
| 004   <Selection> |
| 005     <Condition internalID="4"> |
| 006     <Condition field="AgeInYears" operator="GT" value="55" |
| 007       internalID="1"/> |
| 008   </Selection> |
| 009   <Results> |
| 010     <Field name="FirstName"/> |
| 011     <Field name="AnyTownLastName"/> |
| 012     <Field name="Street"/> |
| 013   </Results> |
| 014 </QueryAbstraction> |

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3 is shown in Table II below. By way of illustration, the illustrative Data Abstraction Model is defined using XML. However, any other language may be used to advantage.

TABLE II

DATA ABSTRACTION MODEL EXAMPLE

```
001  <?xml version="1.0"?>
002  <DataAbstraction>
003    <Category name="Name and Address">
004      <Field queryable="Yes" name="FirstName" displayable="Yes">
005        <AccessMethod>
006          <Simple columnName="f_name" tableName="contact"></Simple>
007        </AccessMethod>
008      </Field>
009      <Field queryable="Yes" name="LastName" displayable="Yes">
010        <AccessMethod>
011          <Simple columnName="l_name" tableName="contact"></Simple>
012        </AccessMethod>
013      </Field>
014      <Field queryable="Yes" name="AnyTownLastName" displayable="Yes">
015        <AccessMethod>
016          <Filter columnName="l_name" tableName="contact"
017            Filter="contact.city=Anytown"> </Filter>
018        </AccessMethod>
019      </Field>
020    </Category>
021    <Category name="Birth and Age">
022      <Field queryable="Yes" name="AgeInDecades" displayable="Yes">
023        <AccessMethod>
024          <Composed columnName="age" tableName="contact"
025            Expression="columnName/10"> </Composed>
026        </AccessMethod>
027      </Field>
028      <Field queryable="Yes" name="AgeInYears" displayable="Yes">
029        <AccessMethod>
030          <Simple columnName="age" tableName="contact"></Simple>
031        </AccessMethod>
032      </Field>
033    </Category>
034  </DataAbstraction>
```

By way of example, note that lines 004-008 correspond to the first field specification $308_1$ of the DAM 132 shown in FIG. 3 and lines 009-013 correspond to the second field specification $308_2$.

As was noted above, the abstract query of Table I can be transformed into a concrete query for query execution. An exemplary method for transforming an abstract query into a concrete query is described below with reference to FIGS. 4-5.

Transforming an Abstract Query into a Concrete Query

Figure 4:
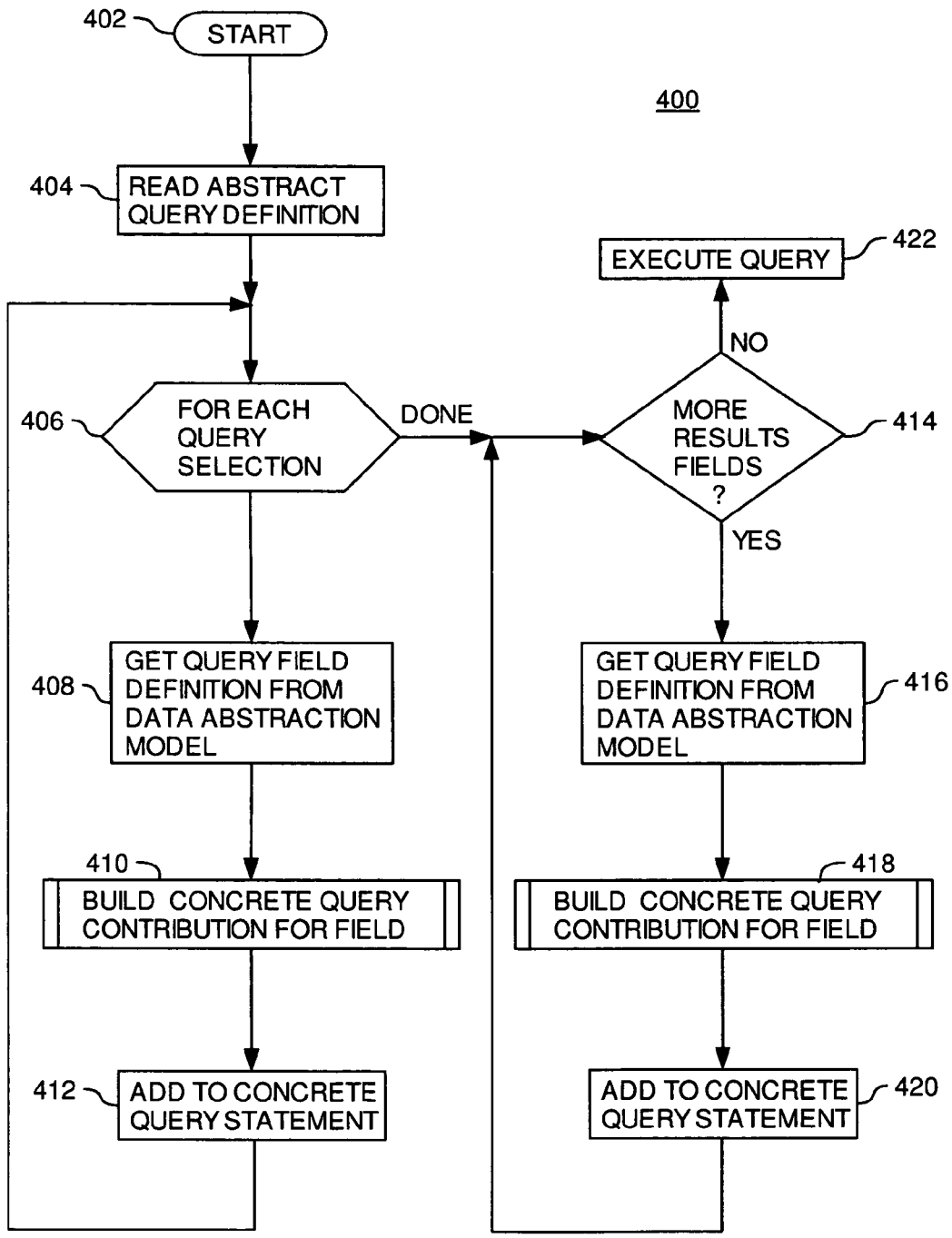
FIGS. 4-5 are flow charts illustrating the operation of a runtime component.

Referring now to FIG. 4, an illustrative runtime method 400 exemplifying one embodiment of transforming an abstract query (e.g., abstract query 202 of FIGS. 2-3) into a concrete query using the runtime component 150 of FIG. 2 is shown. The method 400 is entered at step 402 when the runtime component 150 receives the abstract query (such as the abstract query shown in Table I) as input. At step 404, the runtime component 150 reads and parses the abstract query and locates individual selection criteria and desired result fields. At step 406, the runtime component 150 enters a loop (defined by steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 150 uses the field name from a selection criterion of the abstract query to look up the definition of the field in the data abstraction model 132. As noted above, the field definition includes a definition of the access method used to access the data structure associated with the field. The runtime component 150 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 214 shown in FIG. 2. The concrete query contribution generated for the current field is then added to a concrete query statement (step 412). The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 150 looks up a result field name (from the result specification of the abstract query) in the data abstraction model 132 and then retrieves a result field definition from the data abstraction model 132 to identify the physical location of data to be returned for the current logical result field. The runtime component 150 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
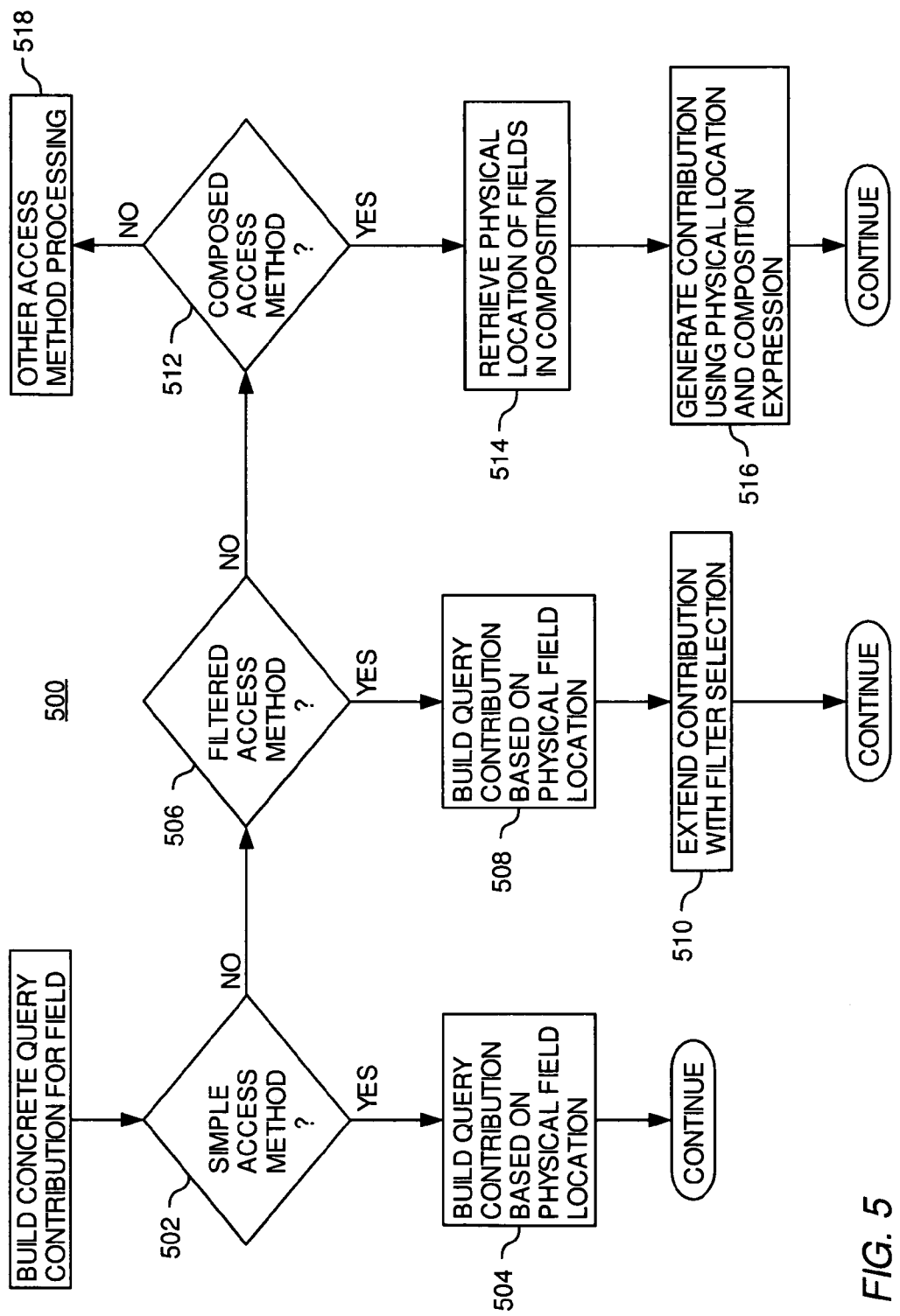

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

An Exemplary Query Creation and Execution Environment

Figure 6:
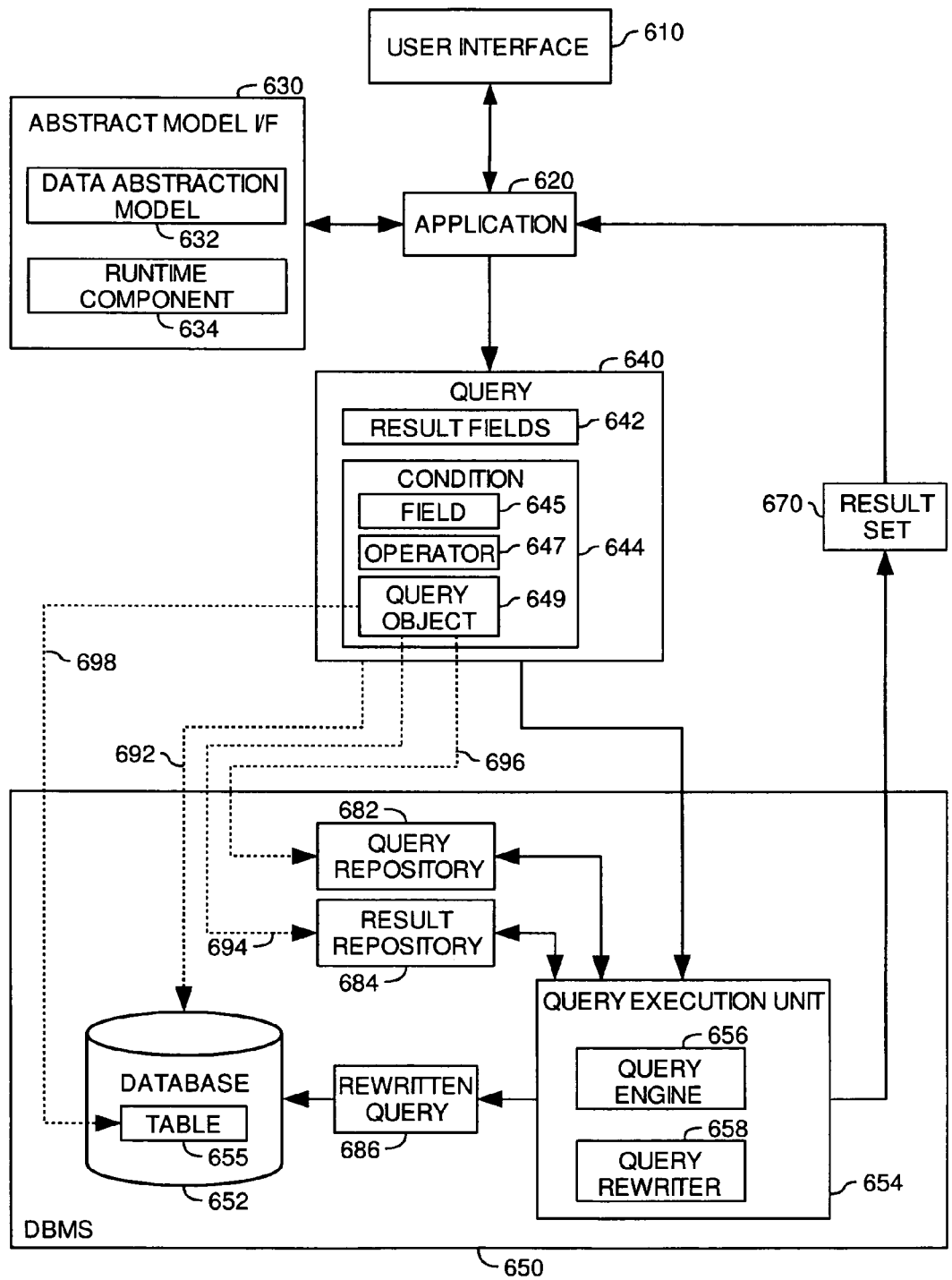
FIG. 6 is a relational view of software components in one embodiment.

Referring now to FIG. 6, a relational view of software components in one embodiment is illustrated. The software components illustratively include a user interface 610, a DBMS 650, one or more applications 620 (only one application is illustrated for simplicity) and an abstract model interface 630. The abstract model interface 630 illustratively provides an interface to a data abstraction model 632 (e.g., data abstraction model 132 of FIG. 2) and a runtime component 634 (e.g., runtime component 150 of FIG. 2). The DBMS 650 illustratively includes a database 652 (e.g., database 214 of FIG. 2) having one or more database tables 655, and a query execution unit 654 having a query engine 656 and a query rewriter 658.

According to one aspect, the application 620 (and more generally, any requesting entity including, at the highest level, users) issues queries against the database 652. The database 652 is shown as a single database for simplicity. However, a given query can be executed against multiple databases which can be distributed relative to one another. Moreover, one or more databases can be distributed to one or more networked devices (e.g., networked devices 146 of FIG. 1). The database 652 is representative of any collection of data regardless of the particular physical representation of the data. A physical representation of data defines an organizational schema of the data. By way of illustration, the database 652 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the application 620 are created by users using the user interface 610, which can be any suitable user interface configured to create/submit queries. According to one aspect, the user interface 610 is a graphical user interface. However, it should be noted that the user interface 610 is only shown by way of example; any suitable requesting entity may create and submit queries against the database 652 (e.g., the application 620, an operating system or an end user). Accordingly, all such implementations are broadly contemplated.

In one embodiment, the requesting entity accesses a suitable database connectivity tool such as a Web application, an Open DataBase Connectivity (ODBC) driver, a Java DataBase Connectivity (JDBC) driver or a Java Application Programming Interface (Java API) for creation of a query. A Web application is an application that is accessible by a Web browser and that provides some function beyond static display of information, for instance by allowing the requesting entity to query the database 652. An ODBC driver is a driver that provides a set of standard application programming interfaces to perform database functions such as connecting to the database 652, performing dynamic SQL functions, and committing or rolling back database transactions. A JDBC driver is a program included with a database management system (e.g., DBMS 650) to support JDBC standard access between the database 652 and Java applications. A Java API is a Java-based interface that allows an application program (e.g., the requesting entity, the ODBC or the JDBC) that is written in a high-level language to use specific data or functions of an operating system or another program (e.g., the application 620).

Accordingly, the queries issued by the application 620 can be in physical form, such as SQL and/or XML queries, which are consistent with the physical representation of the data in the database 652. Alternatively, the queries issued by the application 620 are composed using the abstract model interface 630. In other words, the queries are created on the basis of logical fields defined by the data abstraction model 632 and translated by the runtime component 634 into concrete (i.e., executable) queries for execution. As was noted above, such queries are referred to herein as "abstract queries". An exemplary abstract model interface is described above with reference to FIGS. 2-5.

Illustratively, the application 620 issues a query 640 against the database 652, as illustrated by a dashed arrow 692. In one embodiment, the query 640 is specified by a user using the user interface 610. The query 640 includes at least one result field 642 for which data from the database 652 is to be returned, and one or more query conditions 644. The query conditions 644 are configured for filtering which data record(s) contained in the database 652 is(are) returned for each of the result fields 642. At least one of the query conditions 644 includes a field 645 that is associated with a query object 649 using an operator 647 which is configured to select values for the field 645 from the query object 649. By way of example, the field 645 can be a column of a database table, such as the table 655, or a logical field of an underlying data abstraction model, such as the data abstraction model 632. The query object 649 is an object that is usable to determine values for the field 645.

More specifically, in one embodiment the query object 649 is a subquery of the query 640 that is either created upon specification of the query 640 or retrieved from a query repository 682 having one or more predefined queries, as indicated by a dashed arrow 696. By way of example, a user may use the user interface 610 to create the subquery using a corresponding query building application. Alternatively, the user interface 610 may display a plurality of predefined queries of the query repository 682 to the user in order to allow user selection of the subquery. In both cases, the user interface 610 can be configured to allow only specification or selection of a suitable query object 649.

The subquery may include a single result field that matches the field 645. In this case, the query 640 can be executed using techniques that are well-known in the art and, therefore, not explained in more detail. However, in one embodiment the subquery includes a plurality of result fields that either include a particular result field that matches the field 645, or not. If no matching result field is included with the subquery, the subquery may still access the same database table as the query 640, i.e., table 655, as indicated by a dashed arrow 698. In these cases, the subquery can be processed such that it returns only valid values for the field 645. An exemplary method of processing a subquery in one embodiment is described below with reference to FIG. 8.

Furthermore, in one embodiment the query object 649 can be defined using a predefined data set. For instance, the query object 649 can be defined by a query result included with a result repository 684, as illustrated by a dashed arrow 694. In these cases, the predefined data set can be processed in order to determine the valid values for the field 645 therefrom. An exemplary method of processing a predefined data set in one embodiment is described below with reference to FIG. 9.

In one embodiment, processing a subquery or a predefined data set that defines the query object 649 includes determining whether the query object 649 is configured to provide one or more valid values for the field 645. Exemplary methods for determining whether the query object 649 is configured to provide the valid value(s) are described by way of example below with reference to FIGS. 8-9. If so, the query object is transformed into a transformed query object, whereby the query object 649 is rewritten using the query rewriter 658 such that is returns valid values for the field 645. Thereby a rewritten query 686 is created that can be executed against the database 652. Operation of the query rewriter 658 is described in more detail by way of example with reference to FIGS. 8-9 below.

However, it should be noted that the query rewriter 658 is merely described by way of example to illustrate a component which is suitable to implement aspects of the invention. In other words, the functions of the query rewriter 658 can be implemented into other functional components. For instance, in one embodiment the functions of the query rewriter 658 are implemented by the query engine 656 or a component which is implemented separate from the query execution unit 654. All such implementations are broadly contemplated.

The rewritten query 686 is executed by the query execution unit 654 against the database 652 using the query engine 656 to determine a query result 670. It should be noted that the query execution unit 654 illustratively only includes the query engine 656 and the query rewriter 658, for simplicity. However, the query execution unit 654 may include other components, such as a query parser and a query optimizer. A query parser is generally configured to accept a received query input from a requesting entity, such as the application(s) 620, and then parse the received query. In one embodiment, the query parser may be configured to identify the type of the query object 649 and then forward the parsed query 640 to the query rewriter 658 for rewriting the query 640, if required. The query parser may then parse the rewritten query 686 and forward the parsed rewritten query to the query optimizer for optimization. A query optimizer is an application program which is configured to construct a near optimal search strategy (known as an "access plan") for a given set of search parameters, according to known characteristics of an underlying database (e.g., the database 652), an underlying system on which the search strategy will be executed (e.g., computer system 110 of FIG. 1), and/or optional user specified optimization goals. But not all strategies are equal and various factors may affect the choice of an optimum search strategy. However, in general such search strategies merely determine an optimized use of available hardware/software components to execute respective queries. Once an access plan is selected, the query engine 656 then executes the rewritten query 686 according to the selected access plan.

When executing the rewritten query 686 against the database 652, the query engine 656 identifies each data record of the database 652 that satisfies the query condition(s) 644 to identify the result set 670 for the query 640. In one embodiment, the result set 670 is persistently stored for subsequent retrieval in the result repository 684. The result set 670 is then returned from the query execution unit 654 to the application 620. Operation of the query execution unit 654 is described in more detail below with reference to FIG. 7.

Managing Query Execution

Figure 7:
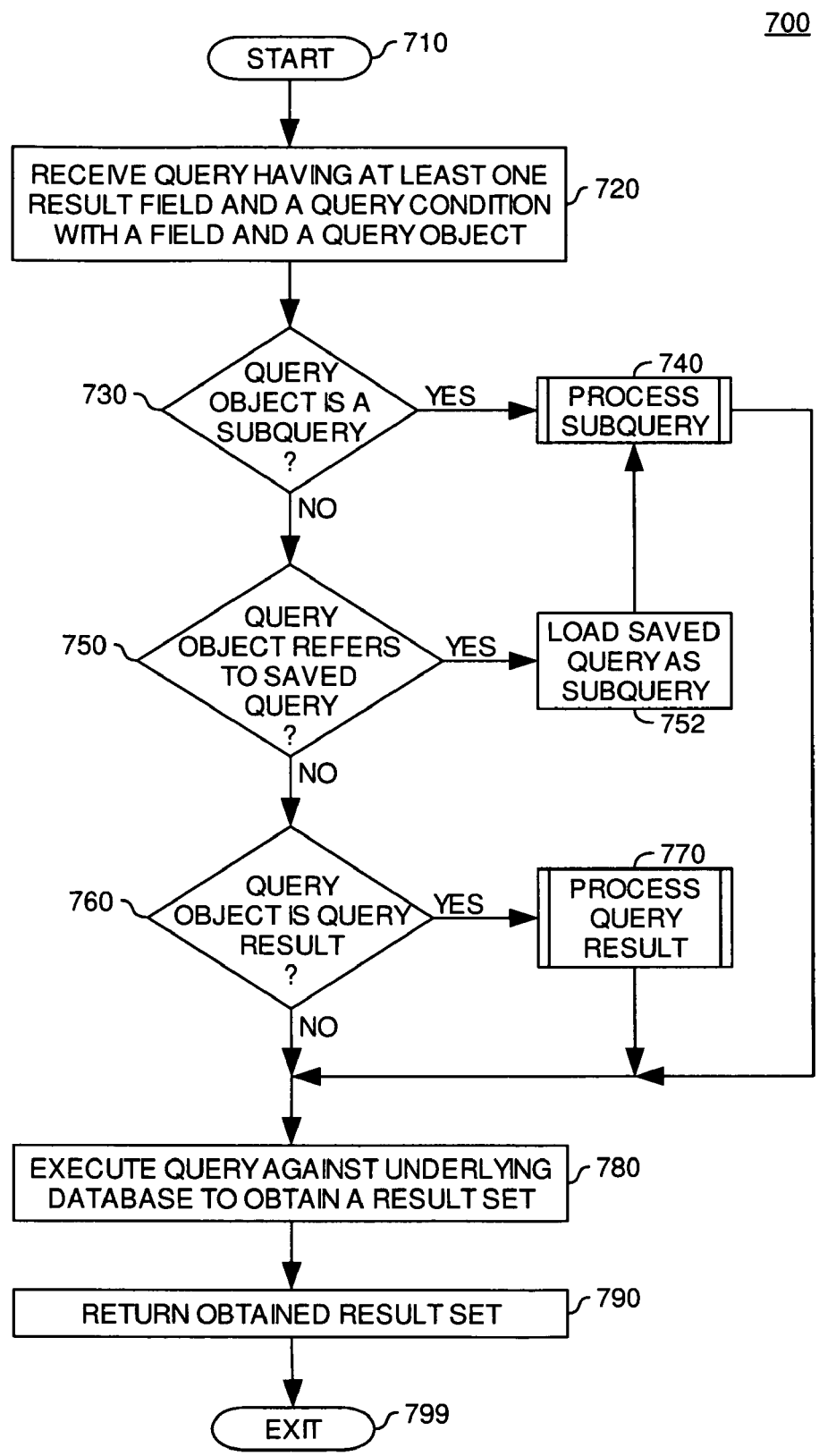
FIG. 7 is a flow chart illustrating query execution management in one embodiment.

Referring now to FIG. 7, one embodiment of a method 700 for managing execution of a query (e.g., query 640 of FIG. 6) having a query condition with a query object is illustrated. In one embodiment, at least part of the steps of the method 700 is performed by the query execution unit 654 of FIG. 6. Furthermore, at least several steps of the method 700 can be performed on the basis of user input received via the user interface 610 of FIG. 6. Method 700 starts at step 710.

At step 720, a query against an underlying database (e.g., database 652 of FIG. 6) is received from a requesting entity (e.g., application 620 of FIG. 6). The query includes at least one result field (e.g., result fields 642 of FIG. 6) and one or more query conditions (e.g., query condition 644 of FIG. 6). At least one query condition includes a field (e.g., field 645 of FIG. 6) and a query object (e.g., query object 649 of FIG. 6)

associated with the field by an operator (e.g., operator 647 of FIG. 6) configured to select values for the field from the query object.

At step 730, it is determined whether the query object is a subquery. For purposes of illustration, assume that the received query was composed by a user using the user interface 610 of FIG. 6. For instance, assume a researcher who wants to perform a study concerning employees of a hospital that have been treated by medical staff of the hospital in order to determine whether the treated employees received better care than customers. To this end, the researcher wants to determine whether specific types of expensive treatments or diagnosis tests that are suitable to detect certain diseases are more frequently performed on employees. Illustratively, an exemplary disease is pancreatic cancer and exemplary expensive treatments therefore are chemotherapy and node removal surgery. Accordingly, the researcher defines the query in order to retrieve information for patients that have had a pancreatic cancer diagnosis, node removal surgery and chemotherapy. The researcher further defines the subquery such that it restricts the retrieved information to information for patients that are also employees of the hospital.

An exemplary query is illustrated in Table III below. By way of example, the query of Table III below is defined using SQL. However, note that the exemplary SQL query of Table III has been simplified such that the relevant parts thereof are not obscured by irrelevant code language. Furthermore, persons skilled in the art will readily recognize complete SQL and/or corresponding XML representations, such as used to describe the exemplary abstract query of Table I. Accordingly, it should be noted that implementation of the exemplary query of Table III is not limited to a particular machine-readable language and that an implementation in any machine-readable language, known or unknown, is broadly contemplated.

TABLE III

SQL QUERY EXAMPLE

| | |
|---|---|
| 001 | Select Patient_ID, Diagnosis, treatment_option |
| 002 | From Patient_Table <joined to> Treatment_Table <joined to> Treatment_Table |
| 003 | Where |
| 004 | diagnosis = 'pancreatic cancer' |
| 005 | and treatment_option = 'node removal surgery' |
| 006 | and treatment_option = 'chemotherapy' |
| 007 | and patient_id IN |
| 008 | Select * |
| 009 | From Patient_Table <joined to> Employee_Table |
| 010 | Where |
| 011 | Patient_ID exists |
| 012 | and (Employee_Job_Class == 'Doctor' |
| 013 | or Employee_Job_Class == 'Administrator') |
| 014 | and Hire_Date < 1/1/2002 |

The exemplary SQL query of Table III is configured to retrieve the required information for particular patients from a database table "Treatment_Table" (line 002). The particular patients, which are also employees of the hospital, are identified using an IN condition (lines 007-014) that links an illustrative subquery (lines 008-014) to a field "patient_id" of one (lines 007-014) of the query conditions defined in lines 003-014 using the SQL operator "IN" (line 007). The subquery is configured to retrieve values for any field (line 008) included with a database table "Employee_Table" (line 009) having data for each employee of the hospital. Note that in the given example the "Patient_Table" (line 002) is merely used to provide the "patient_id" field that is used to join the different tables. However, as SQL is well-known in the art, the exemplary query of Table III is readily understood by persons skilled in the art and is, therefore, not explained in more detail.

In the given example, it is determined at step 730 that the query object is a subquery that includes a multiplicity of result fields ("Select *" in line 008 of Table III). Accordingly, processing continues at step 740, where the subquery is processed such that it returns valid values only for a single result field that matches the field of the at least one query condition, i.e., the "patient_id" field (line 007). An exemplary method of processing a subquery is described below with reference to FIG. 8. In one embodiment, processing the subquery includes rewriting the received query in order to obtain a rewritten query (e.g., rewritten query 686 of FIG. 6) that is executable against the underlying database. The method 700 then proceeds with step 780.

If, however, it is determined at step 730 that the query object is not a subquery, processing continues at step 750. At step 750, it is determined whether the query object specifies a reference to a persistently stored query (e.g., a query included with query repository 682 of FIG. 6). If so, the stored query is retrieved and included as a subquery with the received query at step 752. For instance, assume that in the given example the exemplary query illustrated in Table IV below is received at step 720. By way of example, the query of Table IV below is also defined using SQL and simplified as described above with reference to Table III.

TABLE IV

SQL QUERY EXAMPLE

| | |
|---|---|
| 001 | Select Patient_ID, Diagnosis, treatment_option |
| 002 | From Patient_Table <joined to> Treatment_Table <joined to> Treatment_Table |
| 003 | Where |
| 004 | diagnosis = 'pancreatic cancer' |
| 005 | and treatment_option = 'node removal surgery' |
| 006 | and treatment_option = 'chemotherapy' |
| 007 | and patient_id IN |
| 008 | (saved query "Research Candidate List") |

It should be noted that lines 001-007 of the exemplary query of Table IV correspond to lines 001-007 of Table III above. However, instead of an explicit subquery as included with lines 008-014 of Table III above, the exemplary query of Table IV only includes a reference to a persistently stored query ("saved query") referred to as "Research Candidate List" in line 008.

Assume now that the "Research Candidate List" query is defined by the exemplary query illustrated in Table V below. By way of example, the query of Table V below is also defined using SQL and simplified as described above with reference to Table III.

TABLE V

SAVED QUERY EXAMPLE

| | |
|---|---|
| 001 | Select LastName, FirstName, Address |
| 002 | From Patient_Table <joined to> Employee_Table |
| 003 | Where |
| 004 | Patient_ID exists |
| 005 | and (Employee_Job_Class == 'Doctor' |
| 006 | or Employee_Job_Class == 'Administrator') |
| 007 | and Hire_Date < 1/1/2002 |

It should be noted that the exemplary query of Table V essentially corresponds to the subquery defined in lines 008-014 of Table III. However, instead of having any field of the "Employee_Table" as result field ("Select *" in line 008 of Table III), the exemplary query of Table V is configured to retrieve only values for a "LastName", "FirstName" and "Address" field (line 007 of Table V).

If, at step 752, the "Research Candidate List" query is retrieved and included with the exemplary query of Table IV above, the query illustrated in Table VI below is obtained.

TABLE VI

SQL QUERY EXAMPLE

| | |
|---|---|
| 001 | Select Patient_ID, Diagnosis, treatment_option |
| 002 | From Patient_Table <joined to> Treatment_Table <joined to> Treatment_Table |
| 003 | Where |
| 004 | diagnosis = 'pancreatic cancer' |
| 005 | and treatment_option = 'node removal surgery' |
| 006 | and treatment_option = 'chemotherapy' |
| 007 | and patient_id IN |
| 008 | Select LastName, FirstName, Address |
| 009 | From Patient_Table <joined to> Employee_Table |
| 010 | Where |
| 011 | Patient_ID exists |
| 012 | and (Employee_Job_Class == 'Doctor' |
| 013 | or Employee_Job_Class == 'Administrator') |
| 014 | and Hire_Date < 1/1/2002 |

In the given example, the exemplary query of Table VI is then processed at step 740, as described above. If, however, it is determined at step 750 that the query object is not a reference to a persistently stored query, processing continues at step 760.

It should be noted that including the retrieved "Research Candidate List" query of Table V with the exemplary query of Table IV above is merely described by way of example.

Alternatively, the "Research Candidate List" query of Table V can simply be joined to the exemplary query of Table IV. Thus, any subsequent changes to the "Research Candidate List" query of Table V are reflected in the exemplary query of Table IV. For instance, assume that the researcher stores the exemplary query of Table IV for future use. Assume further that the researcher then wants to limit the search only to doctors of the hospital and therefore removes the query condition "or Employee_Job_Class=='Administrator'" (line 006 of Table V) from the "Research Candidate List" query of Table V. If the "Research Candidate List" query of Table V is only joined to the query of Table IV, the performed change is automatically reflected by the query of Table IV, as the query of Table IV re-accesses in this case the query of Table V for each execution. However, in the example described above where both queries were combined to the exemplary query of Table VI, the researcher would also need to change the exemplary combined query of Table VI by removing the query condition in line 013 thereof. All such implementations are broadly contemplated.

At step 760, it is determined whether the query object specifies a reference to a predefined data set (e.g., a query result included with result repository 684 of FIG. 6). For instance, assume that in the given example the exemplary query illustrated in Table VII below is received at step 720. By way of example, the query of Table VII below is also defined using SQL and simplified as described above with reference to Table III.

TABLE VII

SQL QUERY EXAMPLE

| | |
|---|---|
| 001 | Select Patient_ID, Diagnosis, treatment_option |
| 002 | From Patient_Table <joined to> Treatment_Table <joined to> Treatment_Table |
| 003 | Where |
| 004 | diagnosis = 'pancreatic cancer' |
| 005 | and treatment_option = 'node removal surgery' |
| 006 | and treatment_option = 'chemotherapy' |
| 007 | and patient_id IN |
| 008 | (saved data set "Research Candidate List Output") |

It should be noted that the exemplary query of Table VII corresponds to the exemplary query of Table IV above. However, instead of a reference to a persistently stored query as included with line 008 of Table IV above, the exemplary query of Table VII includes a reference to a persistently stored data set ("saved data set") referred to as "Research Candidate List Output" in line 008 of Table VII. Assume now that the "Research Candidate List Output" data set is defined by the exemplary query result illustrated in Table VIII below.

TABLE VIII

SAVED QUERY RESULT EXAMPLE

| | Patient_ID | Employee_ID | LastName | FirstName | Employee_Job_Class |
|---|---|---|---|---|---|
| 001 | | | | | |
| 002 | 1 | 1001 | Miller | John | Doctor |
| 003 | 12 | 1003 | Smith | Lea | Doctor |
| 004 | 35 | 1017 | Jackson | Fred | Administrator |

By way of example, the query result of Table VIII includes three exemplary data records (lines 002-004), each having a unique patient identifier "Patient_ID" associated with a unique employee identifier "Employee_ID" to uniquely identify the patients that are also employees of the hospital. Furthermore, each data record includes first and last names ("FirstName", "LastName") and a corresponding job class description ("Employee_Job_Class") for each employee. It should be noted that the exemplary query result may include one or more additional fields, such as an "Address" or "Hire_Date" field. However, for simplicity such fields are not included with Table VIII.

If it is determined at step 760 that the query object is a reference to a persistently stored data set, processing continues at step 770, where the data set is processed. Otherwise, processing continues at step 780. An exemplary method of processing a predefined data set in one embodiment is described below with reference to FIG. 9. In one embodiment, processing the predefined data set includes rewriting the query that was received at step 720 in order to obtain a rewritten query (e.g., rewritten query 686 of FIG. 6) that is executable against the underlying database. The method 700 then proceeds with step 780.

At step 780, the query is executed against the underlying database to obtain a corresponding result set (e.g., result set 670 of FIG. 6). The obtained result set is output to the requesting entity at step 790. Method 700 then exits at step 799.

Processing a Subquery

Figure 8:
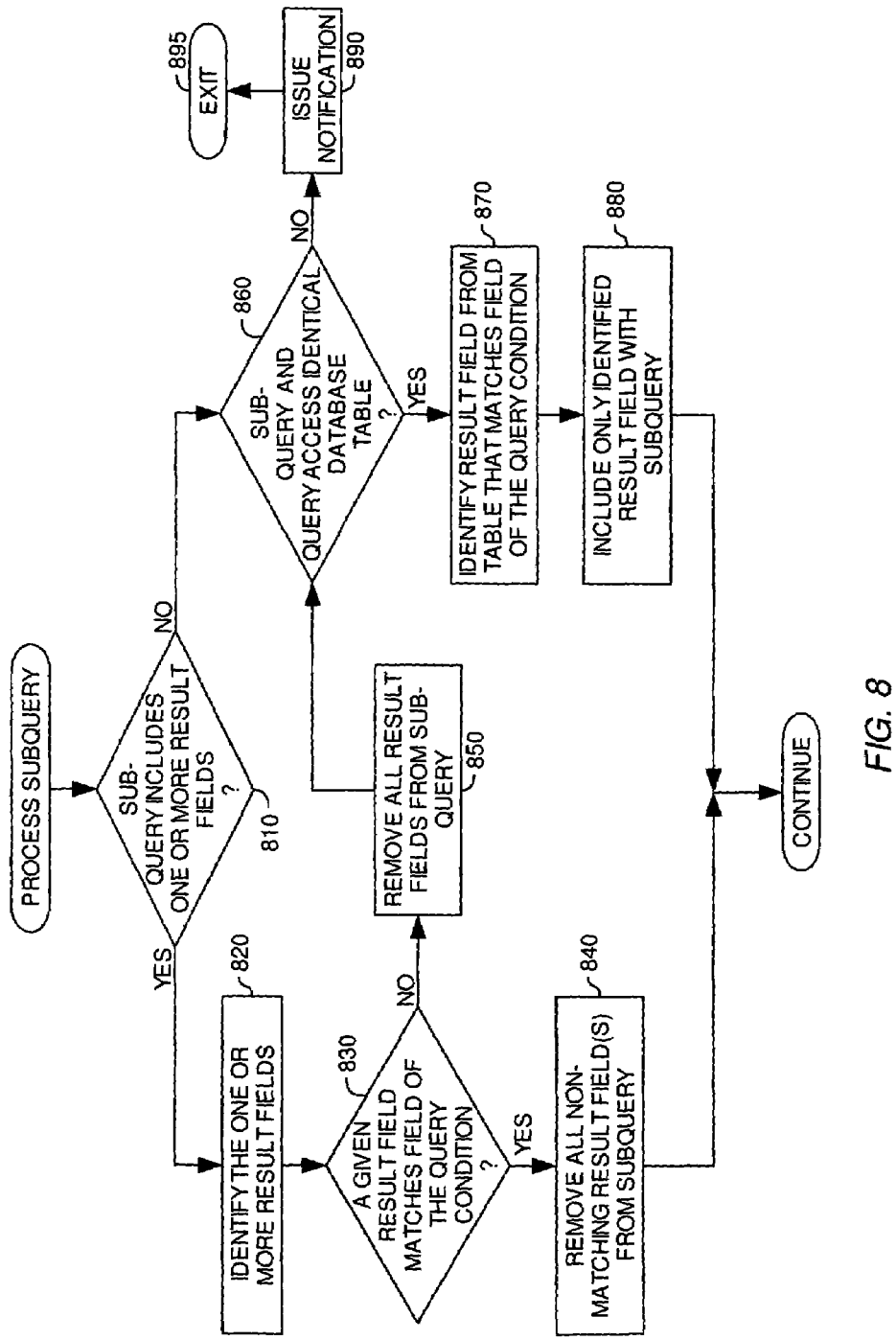
FIG. 8 is a flow chart illustrating subquery processing in one embodiment.

Referring now to FIG. 8, one embodiment of a method 800 for processing a subquery according to step 740 of FIG. 7 is illustrated. According to one aspect, the steps of the method 800 are performed by the query rewriter 658 of FIG. 6. In one embodiment, the method 800 is performed in order to determine whether the subquery is configured to return valid values for the field (e.g., field 645 of FIG. 6) of the query condition (e.g., query condition 644 of FIG. 6) that is associated therewith. The method 800 is further configured to perform suitable processing in order to ensure that the subquery returns the valid value(s), as described below by way of example.

Method 800 starts at step 810, where it is determined whether the subquery includes one or more result fields. If so, processing continues at step 820, where the one or more result fields are identified from the subquery. Otherwise, processing continues at step 860.

After identification of the one or more result fields from the subquery at step 820, it is determined at step 830 whether the identified result fields include a given result field that matches the field of the query condition. If so, processing proceeds with step 840. Otherwise, processing proceeds with step 850.

Assume now that the subquery corresponds to lines 008-014 of Table III above. In this case, all fields of the "Employee_Table" are result fields of the subquery ("Select *" in line 008 of Table III). Assume now that the "Employee_Table" includes a "patient_id" field. Accordingly, it is determined at step 830 that the subquery includes a given result field, i.e., the "patient_id" field that matches the "patient_id" field of the query condition (line 007 of Table III). Thus, processing continues at step 840, where all non-matching result fields are removed from the subquery. In other words, the subquery is rewritten such that it only includes the "patient_id" field as result field. Thereby, the exemplary query of Table III is rewritten and the rewritten query (e.g., rewritten query 686 of FIG. 6) illustrated in Table IX below is obtained.

TABLE IX

REWRITTEN QUERY EXAMPLE

| | |
|---|---|
| 001 | Select Patient_ID, Diagnosis, treatment_option |
| 002 | From Patient_Table <joined to> Treatment_Table <joined to> Treatment_Table |
| 003 | Where |
| 004 | diagnosis = 'pancreatic cancer' |
| 005 | and treatment_option = 'node removal surgery' |
| 006 | and treatment_option = 'chemotherapy' |
| 007 | and patient_id IN |
| 008 | Select patient_id |
| 009 | From Patient_Table <joined to> Employee_Table |
| 010 | Where |
| 011 | Patient_ID exists |
| 012 | and (Employee_Job_Class == 'Doctor' |
| 013 | or Employee_Job_Class == 'Administrator') |
| 014 | and Hire_Date < 1/1/2002 |

Note that the subquery in lines 008-014 of Table IX only includes a single result field "patient_id" (line 008) that matches the field "patient_id" of the query condition (line 007). Processing then continues at step 780 of FIG. 7.

Assume now that the subquery corresponds to lines 008-014 of Table VI above. In this case, the subquery includes the result fields "LastName", "FirstName" and "Address", as noted above. Accordingly, in this case it is determined at step 830 that the subquery does not include a given result field that matches the "patient_id" field of the query condition (line 007 of Table VI). Thus, processing continues at step 850, where all result fields are removed from the subquery. Processing then proceeds with step 860 of FIG. 8.

At step 860, it is determined whether the received query and the subquery access an identical database table or an identical table instance. In one embodiment, this includes determining whether the subquery accesses a table or table instance that has a field that matches the field of the query condition. If so, processing proceeds with step 870. Otherwise, a notification is issued at step 890 indicating that the subquery cannot be processed and the method 800 then exits at step 895. In one embodiment, issuing a notification includes prompting a user for further input. For instance, the user can be requested to modify the subquery such that it is suitable to determine valid values for the field of the query condition.

In the given example, it is determined at step 860 that the subquery accesses the "Employee_Table" (line 009 of Table VI) that includes a "patient_id" field, as was noted above. Accordingly, the "Employee_Table" is accessed at step 870 to identify the "patient_id" field therefrom. In one embodiment, identifying the "patient_id" field from the "Employee_Table" includes verifying whether this field and the "patient_id" field of the query condition (line 007 of Table VI) have an identical data type and purpose. For instance, corresponding metadata can be checked in order to determine whether both fields relate to unique patient identifiers. Thus, it can be avoided that the data types of both fields match, but that the fields themselves serve different purposes (e.g., a patient identifier field versus a weight field). Other verifications that are performed to determine the suitability of the "patient_id" field of the "Employee_Table" are also broadly contemplated. Furthermore, such verifications can also be performed in the context of step 830 described above.

At step 880, the identified result field is included with the subquery. In the given example, the exemplary query of Table VI would thus also be rewritten to the rewritten query of Table IX above. Processing then continues at step 780 of FIG. 7.

Processing a Predefined Data Set

Figure 9:
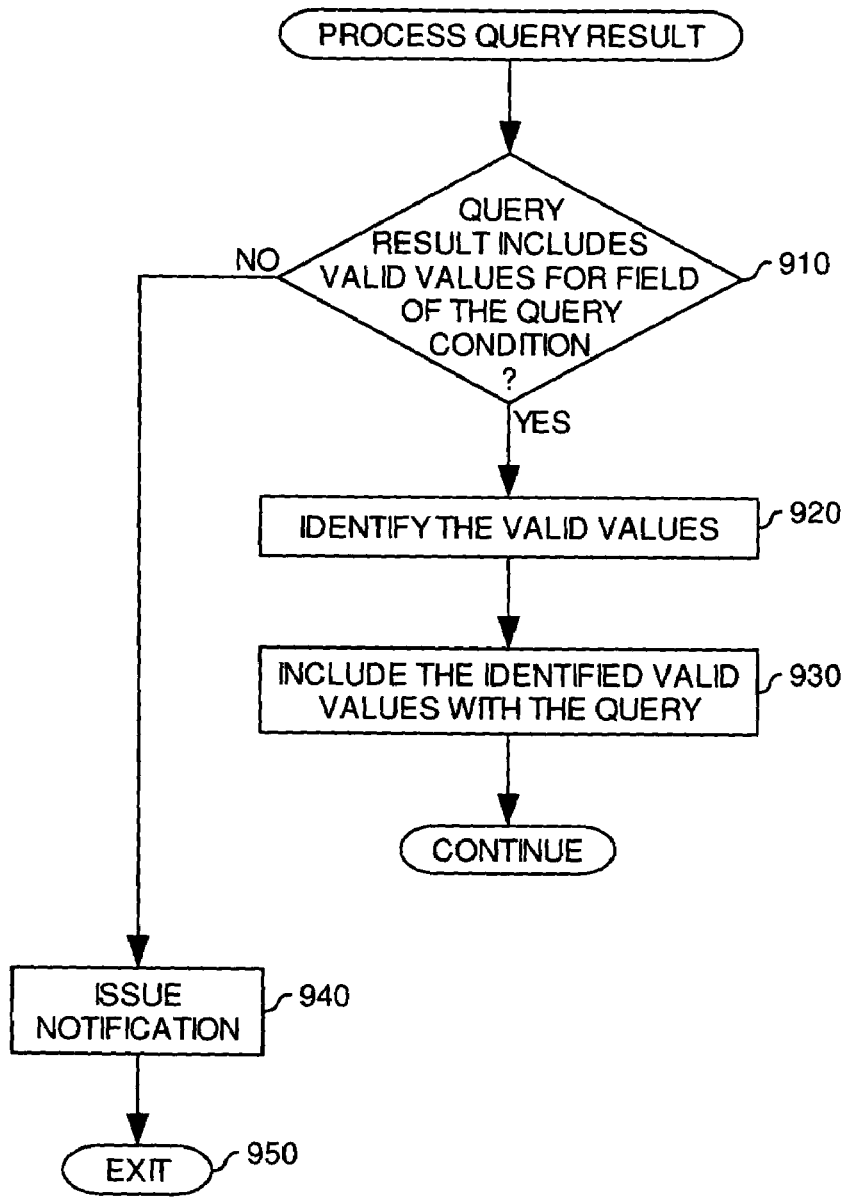
FIG. 9 is a flow chart illustrating query result processing in one embodiment.

Referring now to FIG. 9, one embodiment of a method 900 for processing a predefined data set according to step 770 of FIG. 7 is illustrated. According to one aspect, the steps of the method 900 are performed by the query rewriter 658 of FIG. 6. By way of example, the steps of the method 900 are explained with respect to a query result defining the predefined data set, such as a query result included with result repository 684 of FIG. 6.

Method 900 starts at step 910, where it is determined whether the query result includes valid values for the field (e.g., field 645 of FIG. 6) of the query condition (e.g., query condition 644 of FIG. 6). In one embodiment, determining at step 910 whether the query result includes valid values for the field includes performing corresponding verifications to ensure that values included therewith are suitable, such as described above with reference to step 870 of FIG. 8.

If it is determined at step 910 that the query result includes valid values for the field, processing proceeds with step 920. Otherwise, a notification is issued at step 940 indicating that the query result cannot be processed and the method 900 then exits at step 950. In one embodiment, issuing a notification includes prompting a user for further input. For instance, the user can be requested to indicate another query result that it is suitable to determine valid values for the field of the query condition.

For instance, assume that the received query is defined by the exemplary query of Table VII above. Assume further that the query result is defined by the exemplary query result of Table VIII above, which includes a "Patient_ID" column having the patient identifier values "1", "12" and "35" that are valid values for the field "patient_id" (line 007 of Table VII) of the query condition defined in lines 007-008 of Table VII.

At step 920, the valid values are identified from the query result. At step 930, the identified values are included with the query. Accordingly, in the given example the exemplary query of Table VII is rewritten at step 930 and the rewritten query (e.g., rewritten query 686 of FIG. 6) illustrated in Table X below is obtained.

TABLE X

REWRITTEN QUERY EXAMPLE

| | |
|---|---|
| 001 | Select Patient_ID, Diagnosis, treatment_option |
| 002 | From Patient_Table <joined to> Treatment_Table <joined to> Treatment_Table |
| 003 | Where |
| 004 | diagnosis = 'pancreatic cancer' |
| 005 | and treatment_option = 'node removal surgery' |
| 006 | and treatment_option = 'chemotherapy' |
| 007 | and patient_id IN 1, 12, 35 |

It should be noted that the rewritten query of Table X explicitly includes all identified valid values for the "patient_id" field in line 007. Processing then continues at step 780 of FIG. 7 where the rewritten query is executed to determine a corresponding result set (e.g., result set 670 of FIG. 6).

While the foregoing is directed to embodiments of the present invention, other and further embodiments of the invention may be devised without departing from the basic scope thereof, and the scope thereof is determined by the claims that follow.

What is claimed is:

1. A computer-implemented method of managing execution of a query against data in a database, comprising:
 receiving a plurality of first queries, each first query having:
  (i) at least one result field configured to return data from at least one data record included with the database, and
  (ii) a query condition comprising a field and a query object associated with the field by an operator configured to select values for the field from the query object; wherein each query object is one of a plurality of different query object types;
 for each first query containing a query object of a first type in which the query object is defined by a second query having one or more result fields:
  transforming the query object from being configured not to provide one or more valid values for the field into a transformed query object that is configured to provide one or more valid values for the field; the transforming comprising:
   determining whether a particular result field from the one or more result fields matches the field of the query condition, the second query being configured to return data for the particular result field that defines the one or more valid values; and
   upon determining that the particular result field from the one or more result fields matches the field of the query condition, removing all result fields from the second query, except the identified particular result field, thereby producing the transformed query object; and
  for each first query for which the query object was transformed:
   executing the first query against the database, the executed first query including the transformed query object.

2. The method of claim 1, further comprising, prior to receiving the first query:
 receiving user input specifying the at least one result field and the field of the query condition of the first query;
 allowing user selection of the second query from a plurality of predefined queries, each having one or more result fields including the particular result field that matches the field of the query condition; and
 in response to user selection of the second query, including the selected second query with the query condition of the first query.

3. The method of claim 2, further comprising:
 retrieving the plurality of predefined queries from a query repository.

4. The method of claim 1, wherein the first and second queries are abstract queries; wherein each result field and each field of a query condition of the first and second abstract queries is defined using one or more logical fields of a data abstraction model abstractly describing the data in the database; and wherein the data abstraction model is adapted for transforming the one or more logical fields of the first and second abstract queries into a form consistent with a physical representation of the data in the database.

5. The method of claim 1, wherein the first query accesses a given table in the database and the second query accesses the given table, and wherein the transforming further comprises:
 upon determining that the particular result field from the one or more result fields matches the field of the query conditions:
  removing all result fields from the second query;
  identifying a particular result field from the given table that matches the field of the query condition; and
  including the particular result field with the second query, whereby the second query is configured to return data for the particular result field that defines the one or more valid values.

6. The method of claim 5, further comprising, prior to receiving the first query:
 receiving user input specifying the one or more result fields and the field of the query condition of the first query;
 receiving user input specifying the second query for the query condition; and
 including the second query with the query condition.

7. The method of claim 5, wherein the first and second queries are abstract queries; wherein each result field and each field of a query condition of the first and second abstract queries is defined using one or more logical fields of a data abstraction model abstractly describing the data in the database; and wherein the data abstraction model is adapted for transforming the one or more logical fields of the first and second abstract queries into a form consistent with a physical representation of the data in the database.

8. The method of claim 1, wherein the query object is a second type in which the query object is a query result having data that defines the one or more valid values for the field of the query condition.

9. The method of claim 8, wherein a second type of the query object is one in which the query object is a query result having data that defines the one or more valid values for the field of the query condition; and further comprising:

for each first query containing the query object of the second type:

transforming the query object from being configured not to provide one or more valid values for the field into a transformed query object that is configured to provide one or more valid values for the field; the transforming comprising:

extracting the one or more valid values from the query result; and replacing the query object with the one or more extracted valid values.

\* \* \* \* \*